US010587300B2

(12) United States Patent
Nieminen

(10) Patent No.: US 10,587,300 B2
(45) Date of Patent: Mar. 10, 2020

(54) CONTROL UNIT FOR A COMMUNICATIONS DEVICE

(71) Applicant: Oy Stop Noise Finland Ltd, Jyväskylä (FI)

(72) Inventor: Markku Nieminen, Laukaa (FI)

(73) Assignee: Oy Stop Noise Finland Ltd, Jyväskylä (FI)

(*) Notice: Subject to any disclaimer, the term of this patent is extended or adjusted under 35 U.S.C. 154(b) by 0 days.

(21) Appl. No.: 16/302,697

(22) PCT Filed: May 15, 2017

(86) PCT No.: PCT/FI2017/050371
§ 371 (c)(1),
(2) Date: Nov. 19, 2018

(87) PCT Pub. No.: WO2017/198903
PCT Pub. Date: Nov. 23, 2017

(65) Prior Publication Data
US 2019/0123776 A1 Apr. 25, 2019

(30) Foreign Application Priority Data

May 19, 2016 (FI) ...................................... 20165423

(51) Int. Cl.
*H04B 1/3888* (2015.01)
*H04M 1/02* (2006.01)
(Continued)

(52) U.S. Cl.
CPC ......... *H04B 1/3888* (2013.01); *H04B 1/3833* (2013.01); *H04M 1/0249* (2013.01);
(Continued)

(58) Field of Classification Search
CPC ...... H04B 1/3888; H04B 1/3833; H04B 7/14; H04M 1/0264; H04M 1/72527; H04M 1/0283; H04M 1/185; H04M 1/72583
See application file for complete search history.

(56) References Cited

U.S. PATENT DOCUMENTS 8,825,123 B1 9/2014 Gudino
8,954,117 B2 * 2/2015 Huang ................. H04B 1/3883
455/572

(Continued)

FOREIGN PATENT DOCUMENTS

GB 2505000 A 2/2014
WO 2004028013 A1 4/2004
(Continued)

OTHER PUBLICATIONS

Partial search report of EP17798817.7 issued by European Patent Office dated Sep. 23, 2019, 17 pages.
(Continued)

*Primary Examiner* — Andrew Wendell
(74) *Attorney, Agent, or Firm* — Berggren LLP

(57) ABSTRACT

The present invention relates to a control device (1) for a first communications device (2). The control device (1) comprises at least means (8) for communicating with the first communications device (2). The control device (1) comprises means for coupling the control device (1) to a counterpart (9, 10), and at least part of the user interface (3) of the first communications device (2). The invention also relates to an attachment fitting (20) for use in connection with the control device (1).

10 Claims, 3 Drawing Sheets

(51) Int. Cl.
*H04W 88/06* (2009.01)
*H04B 1/3827* (2015.01)
*H04M 1/725* (2006.01)
*H04B 7/14* (2006.01)

(52) U.S. Cl.
CPC ....... *H04M 1/0254* (2013.01); *H04M 1/0264* (2013.01); *H04M 1/72527* (2013.01); *H04W 88/06* (2013.01); *H04B 7/14* (2013.01)

(56) References Cited

U.S. PATENT DOCUMENTS

| | | | |
|---|---|---|---|
| 2002/0172336 A1 | 11/2002 | Postma et al. | |
| 2002/0180691 A1* | 12/2002 | Wong | G06F 1/1626 |
| | | | 345/156 |
| 2005/0181745 A1* | 8/2005 | Wood | H04B 1/3888 |
| | | | 455/90.3 |
| 2006/0014540 A1 | 1/2006 | Klein | |
| 2007/0111754 A1 | 5/2007 | Marshall et al. | |
| 2008/0305771 A1* | 12/2008 | Yajima | H04M 1/66 |
| | | | 455/411 |
| 2009/0181729 A1 | 7/2009 | Griffin, Jr. | |
| 2012/0023171 A1 | 1/2012 | Redmond | |
| 2013/0150122 A1 | 6/2013 | Kulas | |
| 2013/0170823 A1 | 7/2013 | McDonald et al. | |
| 2013/0177304 A1 | 7/2013 | Chapman et al. | |
| 2013/0231049 A1* | 9/2013 | Sharma | G06F 1/1632 |
| | | | 455/41.2 |
| 2013/0273944 A1* | 10/2013 | Wilson | H04W 4/90 |
| | | | 455/457 |
| 2014/0087722 A1 | 3/2014 | Brittain et al. | |
| 2014/0099905 A1 | 4/2014 | Jimenez | |
| 2014/0171137 A1* | 6/2014 | Oh | H04W 52/0229 |
| | | | 455/509 |
| 2015/0180527 A1* | 6/2015 | Fathollahi | H04B 1/3888 |
| | | | 455/575.8 |
| 2015/0189780 A1* | 7/2015 | Su | H05K 5/0247 |
| | | | 361/807 |
| 2015/0270734 A1* | 9/2015 | Davison | H02J 7/0054 |
| | | | 320/103 |

FOREIGN PATENT DOCUMENTS

| | | |
|---|---|---|
| WO | 2013096927 A1 | 6/2013 |
| WO | 2015018967 A1 | 2/2015 |

OTHER PUBLICATIONS

Search report of EP17798817.7 issued by European Patent Office dated Nov. 11, 2019, 17 pages.

* cited by examiner

CONTROL UNIT FOR A COMMUNICATIONS DEVICE

PRIORITY

This application is a U.S. national application of the international application number PCT/FI2017/050371 filed on 15 May 2017, which claims priority of Finnish patent application FI20165423 filed on May 19, 2016, the contents of all of which are incorporated herein by reference.

FIELD OF THE INVENTION

The present invention relates to a control unit for a communications device, the control unit comprising at least means for communicating with a first communications device, means for connecting the control unit to a counterpart, and the control device comprises at least part of the user interface of the first communications device. The invention also relates to an attachment fitting to be used in connection with the control device, the attachment fitting comprising means for fastening the control device and a second communications device connected to the control device, to the attachment fitting.

BACKGROUND OF THE INVENTION

For some communications devices, the user interface or part of it is designed as a control device separate from the communications device, whereby the data transmission between the user interface and the communications device is arranged either via a wireless connection or by utilizing a wired connection. In this way, the control device comprising the user interface can be picked up and used close to the user's head. In some use situations, there may be a need to use a second communications device as well, whereby it may be difficult to use these two communications devices, because the separate control unit may have to be placed back into a holder, or the like, on the communications device.

On the other hand, e.g. holders are known, by which the control device can be fastened on a shoulder or slightly below it. In this case, however, it may become difficult to use possible keys in the user interface.

To eliminate the drawbacks presented above, there is thus a need to provide an improved arrangement by which it is possible, among other things, to facilitate the use of two separate communications devices.

BRIEF SUMMARY OF THE INVENTION

It is an aim of the present invention to provide a control device for a communications device, for facilitating the use of the user interface of the communications device, as well as a method for using the control device in connection with the communications device. The invention is based on the idea that the control device is configured to be connected to a suitable base, such as a second communications device, and that the control device comprises at least part of the user interface functions of the first communications device.

To put it more precisely, the present invention is primarily characterized in that the counterpart is a second communications device. The attachment fitting according to the present invention is primarily characterized in that the attachment fitting comprises a lens configured to be placed in front of the camera optics of the second communications device when the control device and the second communications device are fastened to the attachment fitting.

Some advantageous embodiments of the present invention will be presented in the dependent claims.

DESCRIPTION OF THE DRAWINGS

In the following, the invention will be described in more detail with reference to the appended figures, in which.

DETAILED DESCRIPTION OF THE INVENTION

Figure 1A:
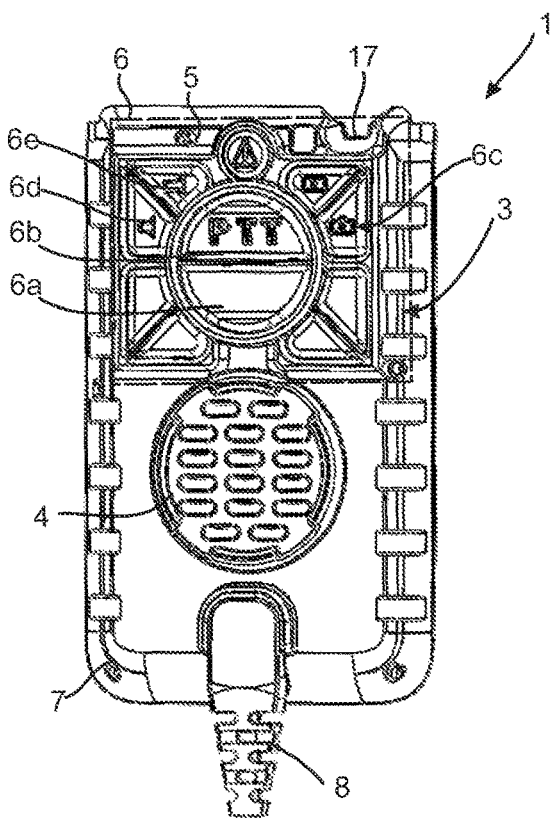
FIG. 1a shows a control device according to a preferred embodiment of the invention, seen from a first direction.

FIG. 1a shows a control device 1 according to a preferred embodiment of the invention, for a communications device 2 (FIG. 4), seen from a first direction, that is, from the side of the user interface functions in this example. The control device 1 comprises at least part of the user interface 3 of the communications device, for example a speaker 4, a microphone 5, and one or more function keys 6. However, it is obvious that the control device may comprise only part of said user interface functions, such as merely the speaker 4 or the microphone 5, or all the user interface functions of the communications device. It is also possible that said user interface functions, or part of them, are included in the communications device itself as well. The user interface functions provided in the control device 1 are configured to communicate with the communications device via a cable 8 and/or in a wireless manner. An example of wireless communication is short-range radio communication, such as Bluetooth®.

Figure 1B:
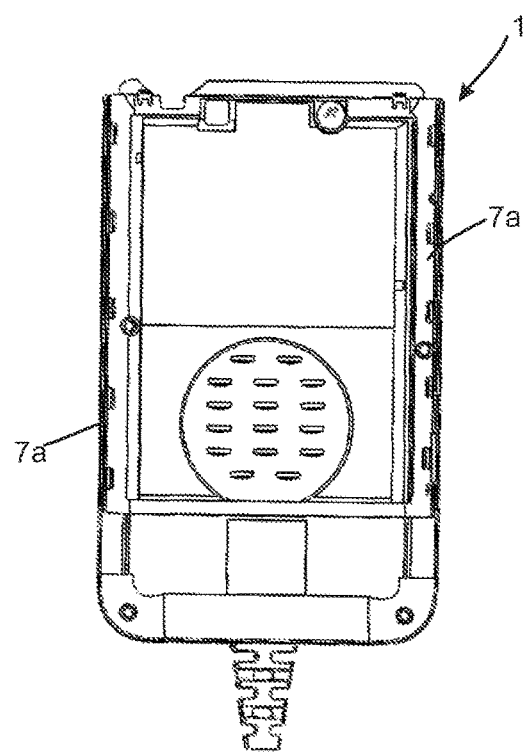
FIG. 1b shows a control device according to a preferred embodiment of the invention, seen from a second direction.

Further, the control device 1 comprises devices 7 for fastening the control device to a counterpart 9. These fastening devices 7 may vary to a great extent in different applications, and their practical implementation may also be influenced by the mechanical properties of the counterpart, and on the other hand, one control device 1 may comprise a plurality of different fastening devices 7. The fastening devices 7 may be, for example, claw-like means 7a (FIG. 1b), whereby the counterpart 9 may be equipped with mating surfaces fitted for the claw-like means, or the claw part of the claw-like means may extend over the edge of the counterpart 9 and thereby clamp the control device 1 against the counterpart 9. In a preferred embodiment of the invention, screws and/or magnets can be used as the fastening devices.

The counterpart 9 can be a piece designed for this purpose, such as a piece of plastic cast into a given form, whereby the primary function of the control device 1 and the counterpart 9 is to facilitate the use of the user interface of the communications device 2 and to make it more convenient to use. The combination of the control device 1 and the counterpart may, for example, be more convenient to hold in hand than the conventional control device as such. On the other hand, the counterpart 9 may be a second communications device 10, whereby the user can pick up the combination of the control device 1 and the second communications device 10 and use both communications devices without having to alternate between different pieces in hand.

Figure 2:
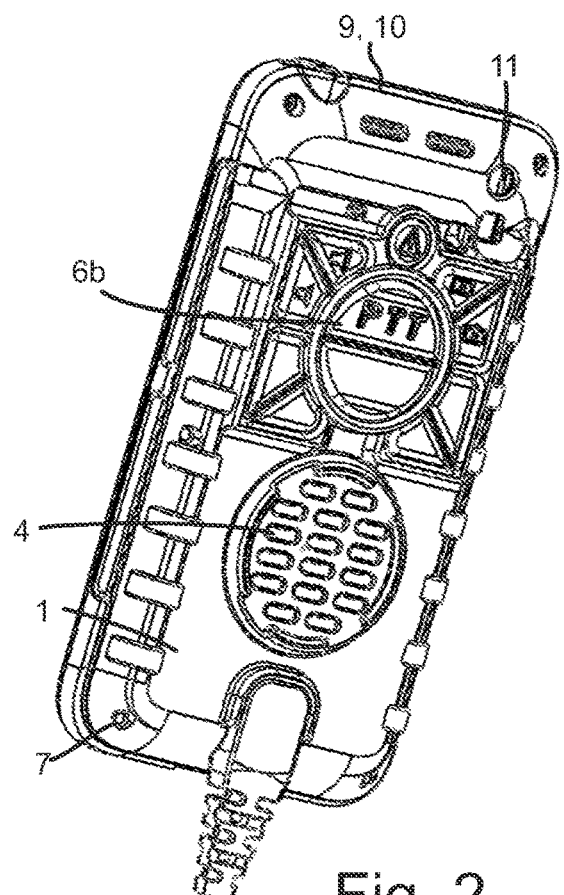
FIG. 2 shows the control device according to FIG. 1 installed in connection with a counterpart.

FIG. 2 shows an example of such an application, in which the control device 1 is connected to a second communications device 10. If necessary, the control device 1 may comprise an opening 17 or the like, to allow e.g. unobstructed exposure of a flash light and/or a camera 11 of the second communications device 10.

In the above presented embodiment, there does not have to be any other functional connection between the first communications device 2 and the second communications device 10 than merely their mechanical connection to each other.

In another preferred embodiment of the invention, at least some of the user interface functions provided in the control device 1 are available as user interface functions of the second communications device 10 as well. For example, if the control device 1 comprises a push-to-talk (PTT) button 6b, this can be used for performing a function of the second communications device 10 as well, for example as a push button, as a button for taking a picture in the camera function, or as a push-to-talk button. On the other hand, the control device 1 may also comprise other function keys which may be common to the first communications device 2 and the second communications device 10. It is also possible that some of the function keys of the control device 1 are intended to be used for controlling the functions of the second communications device 10 only, such as the camera button 6c in the example of FIG. 2.

The communication between the user interface functions of the control device 1 and the second communications device 10 can be implemented in a variety of ways. One possibility is to replace the back cover of the second communications device 10 with the control device 1, whereby the control device 1 may comprise electrical connectors which are coupled to corresponding connectors in the second communications device 10. Another alternative is a wireless connection, whereby the communication can be implemented optically, by radio signals, by induction, and/or acoustically. It is also possible to apply more than one of the above mentioned methods.

In yet another preferred embodiment of the invention, the functions of the second communications device 10 can be used for controlling the operation of the first communications device 2 by means of the control device 1. Even in such a situation, the control device 1 is connected to the second communications device 10, and the control device 1 or the first communications device 2 comprises means for transmitting the user interface functions of the second communications device 10 to the first communications device. An example is call functions, whereby the mode of the second communications device 10 can be selected to be a mode in which the user interface of the second communications device 10 is switched as the user interface for the first communications device 2. Thus, the user interface of the second communications device 10 can be used for controlling the first communications device 2, for example, for making calls, receiving calls, transmitting messages, etc. One aim of the control device 1 in this embodiment is to provide a better feel in use.

The control device 1 according to the invention may have other user interface functions as well, such as an accelerator sensor, a positioning receiver, or the like. By means of an acceleration sensor, it is possible to monitor whether the control device 1 is in motion or stationary, and on the basis of this, in some use situations, to conclude the readiness for action of the user of the communications device 2, 10 at the time, and whether there is a need to give an automatic alarm, or the like.

We shall now describe an example on a situation of use of a communications device combination equipped with a control device 1 according to the invention. Let us assume that the control device 1 comprises at least a speaker 4, a microphone 5 and function keys 6 for a first communications device 2, and that the control device 1 is connected to a second communications device 10. Let us also assume that the first communications device 2 is a radio telephone or the like, for example a phone which is designed for use by the authorities and in which a call to a predetermined receiver can be initiated by a given shortcut key. The user may have attached the control device 2 to hang from a shoulder, for example, and for making a call by the first communications device 2, the user may press the shortcut key 6a in the control device 2. When the call is made, a voice on the other end, or the like, may be heard from the speaker 4, and in a corresponding way when the user wants to speak, he/she may press the push-to-talk button 6b. For using the second communications device 10, the user can pick up the control device 1 and expose the second communications device 10 in the use position, after which the second communications device 10 can be used in the conventional way. On the other hand, the user may have a need to use the camera 11 of the second communications device 10 when the control device 1 is on his/her shoulder, whereby the user can apply the function key 6c of the control device to start the camera 11 of the second communications device 10 without taking the control device 11 off his/her shoulder. The user can thus e.g. record video with the camera 11 without having to pick up the control device 1. For adjusting the sound volume, the control device 1 may comprise a volume down key 6d and a volume up key 6e (FIG. 1a).

Figure 3A:
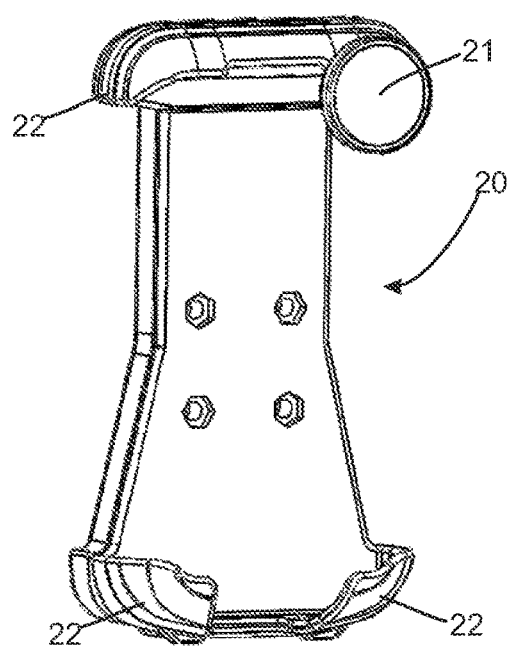
FIG. 3a shows an attachment fitting, to which the control device according to an advantageous embodiment of the invention and the counterpart can be connected.
Figure 3B:
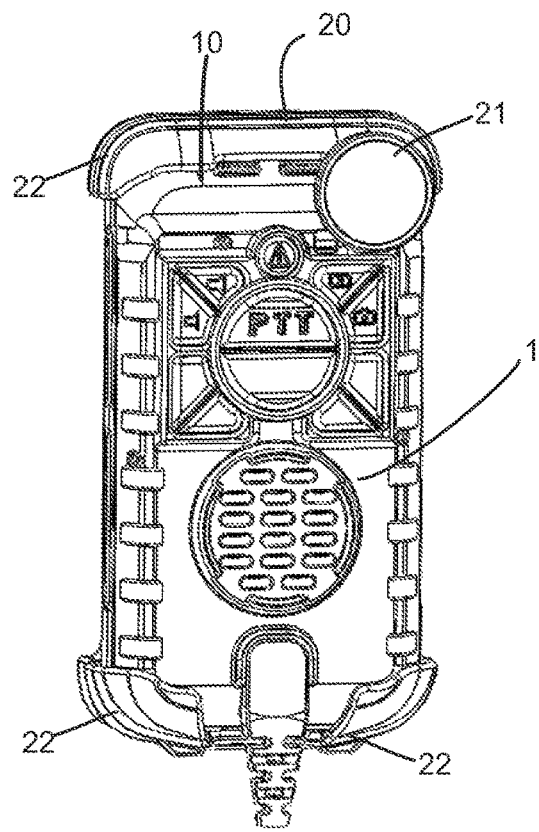
FIG. 3b shows an attachment fitting according to FIG. 3a, to which a control device according to a preferred embodiment of the invention and the counterpart have been connected.

FIG. 3a shows an example of an attachment fitting 20, to which the control device 1 according to the invention and the second communications device 10 can be clamped. This attachment fitting 20 can be placed, for example, on the user's shoulder, breast, or another suitable place. When the control device 1 and the second communications device 10 are connected to the attachment fitting 20, a lens 21 in the attachment fitting 20 is aligned with the optics (on the optical line) of the camera 11 of the second communications device 10, improving and/or changing the optical properties of the camera 11. The attachment fitting 20 may comprise claws to secure that the combination of the control device 1 and the second communications device 10 is clamped to the attachment fitting 20, as illustrated in FIG. 3b.

Figure 4:
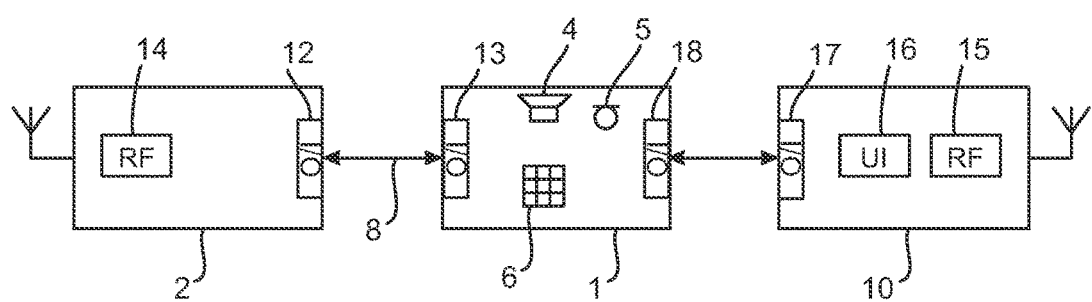
FIG. 4 is a reduced block chart illustrating some functions of the control device, the first communications device and the second communications device.

Further, FIG. 4 shows a reduced block chart on some functions of a control device 1 according to a preferred embodiment of the invention, a first communications device 2 and a second communications device 10, and the connection between these. For example, the first communications device 2 may comprise first radio communication means 14 by which the first communications device 2 can communicate with a first communications system, such as an authorities' telecommunications network (TETRA, Terrestrial Trunked Radio) (not shown). In a corresponding way, the second communications network 10 may comprise, for example, second radio communication means 15 by which the second communications device 2 can communicate with a second communications system, such as a mobile communications network (LTE, GSM, GPRS) (not shown). The block chart of FIG. 4 further shows the user interface (UI)

16 of the second communications device 10, which may thus comprise a speaker/an earpiece, a microphone, a keypad, and/or other user interface functions, as well as control functions for the second communications device 10. The block chart of FIG. 4 does not show possible short-range wireless communication means for transferring audio information, video information and/or other control information between the control device 1, the first communications device 2 and/or the second communications device 10. The connection between the first communications device 2 and the control device 1 is illustrated by connecting means 12, 13 (I/O, Input/Output). In a corresponding way, the connection between the second communications device 10 and the control device 1 is illustrated by connecting means 17, 18.

It should further be noted that the control device 1 according to the invention is applicable in a number of different combinations of communications devices, some of which have been described above. For example, the control device 1 is used as an at least partial user interface for one communications device, such as a mobile station communicating with a public land mobile network, without another communication device, or as an at least partial user interface for a communications device communicating with an authorities' network, without another communication device, in such a way that the control device is used as an at least partial user interface for either one or both of these communication devices, and/or the control device 1 is used for transmitting user interface functions of these two communications devices, for example from the second communications device to the first communications device, and/or vice versa.

It should further be mentioned in this context that the attachment fitting 20 of FIG. 3a can also be used in applications in which the control device 1 is not used but the communications device 2, 10 is converted to a body camera. This attachment fitting 20 can be placed, for example, on the user's shoulder, breast or another suitable place, and if necessary, the attachment fitting 20 can be attached to the user's clothing, and the communications device 2, 10 is clamped to the attachment fitting 20. Such a combination of the attachment fitting 20 and the communications device 2, 10 makes it possible that the communications device 2, 10 does not have to be held in hand during the use of the communications device 2, 10. The attachment fitting 20 according to an advantageous embodiment of the invention is implemented in such a way that when the communications device 2, 10 is clamped to the attachment fitting 20, the camera of the communications device 2, 10 is aligned with the lens 21 of the attachment fitting, as already explained in this description above. For example, the communications device 2, 10 can be clamped to the attachment fitting 20 of FIG. 3a without connecting the control unit 1 to the communications device 2, 10.

In the attachment fitting 20 according to a preferred embodiment of the invention, it is possible to alter the position of the lens 21. This alteration in the position can be implemented either in a stepless manner within given extreme limits, or two or more fixing points are provided for the lens 21. Such an implementation makes it possible to select an optimal position for the lens 21 according to the position of the camera of the respective communications device 2, 10.

In the following, further advantageous examples will be presented.

A control device 1 according to the first example of the invention, provided for a first communications device 2, comprises at least means 8 for communicating with the first communications device 2, means for connecting the control device 1 to the counterpart 9, 10, and that the control device 1 comprises at least part of the user interface 3 of the first communications device 2.

In the control device 1 according to a preferred embodiment of the invention, the counterpart 9, 10 is a second communications device 10.

The control device 1 according to a preferred embodiment of the invention comprises means 13, 18 for using at least part of the user interface functions of the second communications device 10 in connection with the first communications device 2.

In the control device 1 according to a preferred embodiment of the invention, at least one of the following user interface functions of the second communications device 10 is used as the corresponding user interface function in connection with the first communications device 2:
  a keypad,
  a speaker,
  a microphone.

The control device 1 according to a preferred embodiment of the invention comprises means 6c for controlling the camera 11 of the second communications device 10.

The control device 1 according to a preferred embodiment of the invention comprises fastening devices 7 for replacing the back cover of the second communications device 10 with the control device 1, and means for coupling the control device 1 electrically to the user interface of the second communications device 10.

The attachment fitting 20 according to a second example of the invention is intended for use in connection with the control device 1, the attachment fitting 20 comprising means 22 for clamping the second communications device 10, connected to the control device, to the attachment fitting 20.

The attachment fitting 20 according to a preferred embodiment of the invention comprises a lens 21 configured to be placed in front of the optics of the camera 11 of the second communications device 10 when the control device 1 and the second communications device 10 are clamped to the attachment fitting 20.

The attachment fitting 20 according to a third example of the invention comprises an attachment fitting with means 22 for fastening the communications device 2, 10 to the attachment fitting 20, and a lens 21, whereby the attachment fitting 20 is configured to hold the communications device 2, 10 in such a way that the lens of the camera of the communications device 2, 10, and the lens 21 of the attachment fitting are on the same optical axis.

An attachment fitting 20 according to a preferred embodiment of the invention comprises means for altering the position of the lens 21.

The present invention is not limited solely to the above-presented embodiments, but it can be modified within the scope of the appended claims.

The invention claimed is:

1. A control device for a first communications device, the control device comprising at least:
  a communication element configured to communicate with the first communications device; and
  a coupling element for coupling the control device to a second communications device, at least part of a user interface of the first communications device,
  wherein the control device is configured to use at least part of the user interface functions of the second communications device in connection with the first communications device, wherein a counterpart is the second communications device, wherein the control device is configured to directly communicate with both the first communications device and the second communications device, and wherein the control device further comprises a fastening element configured to replace the back cover of the second communications device with the control device; and a connecting element configured to connect the control device electrically to the user interface of the second communications device.

2. The control device according to claim 1, configured to use at least one of the following user interface functions of the second communications device as the corresponding user interface function in connection with the first communications device; a keypad, a speaker, a microphone.

3. The control device according to claim 1, configured to control the camera of the second communications device.

4. An attachment fitting for use in connection with a control device according to claim 1, the attachment fitting comprising: one or more clamps for clamping the control device and the second communications device, connected to the control device, to the attachment fitting; and, a lens configured to be placed in front of the optics of the camera of the second communications device when the control device and the second communications device are clamped to the attachment fitting.

5. The attachment fitting according to claim 4 comprising an adjusting element configured to alter the position of the lens.

6. The attachment fitting according to claim 4, wherein the control device comprises a push-to-talk button configured to be used for one or more of the following: performing a function of the second communications device; as a button for taking a picture in the camera function; as a push-to-talk button.

7. The attachment fitting according to claim 4, wherein the control device comprises a communication element configured to transmit the user interface functions of the second communications device to the first communications device.

8. The attachment fitting according to claim 6, wherein the control device comprises an acceleration sensor configured to monitor whether the control device is in motion or stationary.

9. The attachment fitting according to claim 8, wherein the control device is configured to use information from the acceleration sensor to conclude readiness for action of the user of the first communications device or the second communications device.

10. A control device for a first communications device, the control device comprising:

at least a communication element configured to communicate with the first communications device;

a coupling element configured to couple the control device to a second communications device; and at least part of the user interface of the first communications device, wherein the control device is configured to use at least part of the user interface functions of the second communications device in connection with the first communications device, wherein a counterpart is the second communications device, wherein the control device is configured to directly communicate with both the first communications device and the second communications device, and wherein the control device further comprises a fastening element configured to attach a back cover of the second communications device with the control device, and a connecting element configured to connect the control device electrically to the user interface of the second communications device.

* * * * *